United States Patent [19]
Prill et al.

[11] Patent Number: 5,272,833
[45] Date of Patent: Dec. 28, 1993

[54] SOIL REMEDIATION APPARATUS AND METHOD FOR SAME

[75] Inventors: Frederic W. Prill, North Aurora; Robert E. Farnham, Naperville, both of Ill.

[73] Assignee: Asphalt Product Technologies, Inc., Geneva, Ill.

[21] Appl. No.: 574,209

[22] Filed: Aug. 28, 1990

[51] Int. Cl.⁵ .................... A01B 77/00; F23G 5/06; F23G 5/04
[52] U.S. Cl. .................... 47/1.42; 110/246; 110/341; 110/346; 110/216
[58] Field of Search ........ 110/246, 216, 215, 210–212, 110/341, 346; 47/1.42

[56] References Cited

U.S. PATENT DOCUMENTS

| | | | |
|---|---|---|---|
| 3,627,289 | 12/1971 | Erman | 110/246 |
| 4,245,571 | 1/1981 | Przewalski | 110/246 |
| 4,274,344 | 6/1981 | Nider | 110/346 |
| 4,575,336 | 3/1986 | Mudd et al. | 100/238 |
| 4,708,641 | 11/1987 | Meininger | 110/246 |
| 4,751,887 | 6/1988 | Terry et al. | 110/246 |
| 4,782,625 | 11/1988 | Gerken et al. | 47/1.42 |
| 4,827,854 | 5/1989 | Collette | 110/246 |
| 4,890,563 | 1/1990 | White et al. | 110/246 |
| 4,945,839 | 8/1990 | Collette | 110/246 |
| 4,947,767 | 9/1990 | Collette | 110/246 |
| 4,951,417 | 8/1990 | Gerken et al. | 47/1.42 |
| 4,958,578 | 9/1990 | Houser | 110/246 |
| 5,085,581 | 2/1992 | Mendenhall | 110/246 |

OTHER PUBLICATIONS

"Gencor Soil Remediator", Oct. 13, 1989.
Thermotech Systems Corporation, "Specification and Data" Cleaning Up Your Act, Nov.–Dec. 1989.
Raymond C. Czarnecki, "processing of Oil Contaminated Soil In a Hot Mix Asphalt Facility" Moonlighting for the EPA, Mar.–Apr. 1989.

*Primary Examiner*—Henry C. Yuen
*Attorney, Agent, or Firm*—Wallenstein, Wagner & Hattis, Ltd.

[57] ABSTRACT

An apparatus for remediating soil contaminated with combustible pollutants comprising means for initially heating the contaminated soil to a temperature sufficient to vaporize contaminants present therein, means for feeding the contaminated soil to the initial heating means, means for reheating gases created by vaporizing the contaminants, means for introducing the gases to the reheating means, means for cooling the gases, means for removing particulate matter from the gases, and means for exhausting the gases to the atmosphere.

4 Claims, 3 Drawing Sheets

SOIL REMEDIATION APPARATUS AND METHOD FOR SAME

TECHNICAL FIELD OF THE INVENTION

The present invention relates to soil remediation. More specifically, it relates to an apparatus for removal of hydrocarbons and similar substances from contaminated soil such that the soil may be reused.

BACKGROUND OF THE INVENTION

With the heavy regulation by both federal and state governments concerning in-ground pollution, a need has developed for an economical and effective method of removing pollutants from soil. Gasoline and other petroleum products containing hydrocarbons are one of the largest sources of such soil contamination. Pollution of the soil by hydrocarbons occurs in various ways. For instance, gasoline is generally stored in underground tanks at service stations as well as at refineries and other storage facilities. Before the advent of plastics, underground tanks were made of metals, which over the years were susceptible to corrosion and the inevitable leakage. The Environmental Protection Agency estimates that approximately one-third of the nation's underground storage tanks are leaking. Contamination of the soil also occurs due to spills of oil, gasoline, or other petroleum products or disposal of manufacturing wastes.

Moreover, laws, such as the recently reenacted Superfund, require the disclosure of the presence of soil contaminants to potential buyers of industrial or commercial property. Because no potential buyer would purchase property upon which the soil was contaminated, owners of contaminated sites must rid the soil of contaminants prior to sale of the property.

There are several options in treating soil contaminated with hydrocarbons. The soil can be removed and transported to a landfill for permanent storage. However, many landfill sites will not take soil that is contaminated by hydrocarbons. There are also problems of continuing liability for the tainted soil should the landfill site eventually have to be cleaned up. Moreover, storage at a landfill does not remove contaminants from the soil, nor does it allow the soil to be reused, but merely moves the problem to another site.

Another method of cleaning hydrocarbon contaminated soil is aeration and biodegradation. This process entails placing the contaminated soil on a layer of plastic film and allowing the hydrocarbons to evaporate and biodegrade. This process is very slow, and merely transfers the problem to one of air rather than soil pollution.

A further alternative is incineration of the contaminated soil. While incineration is effective, hazardous waste incinerators are scarce, and incineration is very expensive.

Mobile soil remediation units have also been developed. The mobile unit is attached to a truck and transported from site to site to perform a clean up of the polluted soil. The mobile system comprises a feed hopper which feeds the polluted soil into a dryer having a burner at one end. The tainted soil is heated in the dryer, thus evaporating the hydrocarbons and other combustible materials in the soil. The gases generated by the vaporization of the hydrocarbons are exhausted to a baghouse for removal of particulate matter from the gases. In many instances, a separate afterburner and stack unit is transported along with the unit and attaches to the end of the baghouse. As the gases exit the baghouse, the afterburner heats the gases to destroy remaining hydrocarbons present in the gases. The gases are then exhausted from the stack. The gases emitted from the stack are very hot because of the afterburning. Stationary soil remediation plants embodying the same principles have also been developed.

In the mobile and stationary soil remediation plants having an afterburner, the afterburner accepts exhaust gases after they have exited from the baghouse. This is because in view of current technology, the bag material can only withstand temperatures to a maximum of 350°-400° F. Up to now, if the afterburner were placed before the baghouse, the resulting hot gases would destroy the bags.

However, in some cases, the mobile and stationary systems described above may be too expensive to build, and relatively few are in existence. The apparatus presently in use for mobile soil remediation can also be quite large and cumbersome to transport from site to site depending on the desired volume of soil to be remediated. Furthermore, site permits would be needed, and possibly EPA permits.

Furthermore, if there are vaporized hydrocarbons remaining in the gas stream while in the baghouse, they tend to clog the bags, thereby reducing the efficiency of particulate removal. This also necessitates more frequent changing of bags, and thus greater maintenance costs. Therefore, there is a need for a soil remediation unit which will burn off all of the hydrocarbons in the effluent gases prior to the effluent gases entering the baghouse, but still keeping the exhaust gas temperature sufficiently below the critical temperature 350°-400° F.

A relatively inexpensive and effective alternative method of soil remediation is to utilize an existing hot mix asphalt plant to rid the soil of combustible materials. As opposed to incinerators or landfills, asphalt plants are relatively plentiful as there are approximately 5,000 asphalt plants currently operating in the United States. Processing the contaminated soil using asphalt plants also requires little capital investment as the bulk of the equipment necessary for soil remediation is necessarily already in place. Only certain modifications and additions need to be made to adapt the asphalt plant to process contaminated soil.

A typical hot mix asphalt plant operates as follows. Hot mix asphalt is comprised of aggregate consisting of various sized particulate matter mixed with hot asphaltic oil. Virgin aggregate is loaded into one end of a large drum mixer or dryer drum. It will be understood that while the typical hot mix asphalt plant and the present invention will be described using a drum mixer as an example, the discussion also may relate to hot mix batch plants using a dryer. At one end of the drum mixer is a burner, usually gas or oil-fired. The aggregate is heated in the drum mixer by the burner to evaporate any moisture from the aggregate and to heat it to the mixing temperature of approximately 300° F. Once dry, the aggregate is coated and mixed with heated asphaltic oil either within the drum mixer or, in the case of the dryer, in a separate mixing unit. The inside of the drum mixer has aggregate lifting flights attached. The drum rotates to assure that the aggregate is cascaded through the drying zone, and to ensure total mixing of the asphaltic oil and aggregate. The drum mixer is usually inclined to allow gravity to advance the aggregate and asphalt mix to travel through it. After the hot mix asphalt is mixed, it is then transported by conveyor or elevator to storage silos pending transport by truck to a desired site.

As a result of combustion by the burner, gases are created which entrain particulate matter from the aggregate. These gases are exhausted from the drum mixer. Particulate matter from the gases are removed in a baghouse prior to discharge into the atmosphere through a stack. The operation of a hot mix asphalt plant is well-known to one skilled in the art.

Previous attempts at adapting asphalt plants to perform soil remediation have been made. In early attempts, the contaminated soil was simply added to the aggregate prior to its introduction into the drum mixer. The purpose of this was to use the heat generated by the burner to evaporate the hydrocarbons present in the soil. In many asphalt plants, the aggregate enters the drum mixer at the end opposite the burner. This is known in the trade as a "counterflow" unit. The resulting temperatures at the aggregate entrance were too low to effectively burn off the hydrocarbons, thus causing high levels of hydrocarbons to be emitted to the atmosphere.

Later developments introduced the contaminated soil at the burner end of what is known as a "parallel-flow" drum mixer. See, a speech by Czarnecki, "Processing of Oil Contaminated Soil in a Hot Mix Asphalt Facility." Mr. Czarnecki was employed by Brox Industries, Inc., of Dracut, Mass. The Czarnecki speech discloses a ceramic cylinder added to the burner end of a dryer. The burner is attached to the outside end of the ceramic cylinder, and as a result, the flame from the burner fills the cylinder. Contaminated soil is fed into the ceramic cylinder. The cylinder is equipped with flights and is rotated to allow the soil to cascade through the cylinder while the burner flame heats the soil and burns off the hydrocarbons. The purified soil is then mixed with aggregate and is incorporated into the hot mix asphalt.

This system disclosed in the Czarnecki system is said to result in an efficiency of approximately ninety-five percent hydrocarbon destruction. However, that means that five percent of the hydrocarbons remain uncombusted and are discharged into the air. With this system it is also impossible to adjust for varying types of contaminated soil, or to control other variables. Rather, the parameters for the soil remediation such as burner temperature and residence time in the processing area are set by the needs of the asphalt plant. As a result, the removal of hydrocarbons from the soil cannot be optimized to adjust for variations in the type of soil or hydrocarbon content.

SUMMARY OF THE INVENTION

In all embodiments, the soil remediation unit of the present invention comprises means for initially heating the contaminated soil to a temperature sufficient to vaporize contaminants present therein, means for feeding the contaminated soil to the initial heating means, means for reheating gases created by vaporizing the contaminants, means for introducing the gases to the reheating means, means for cooling the gases, means for removing particulate matter from the gases, and means for exhausting the gases to the atmosphere.

In one embodiment of the present invention, the soil is remediated by retrofit to an existing hot mix asphalt plant to remove hydrocarbons and other combustible contaminants from soil. More particularly, the present invention incorporates the initial heating means and feeding means with an existing asphalt plant to effectively and economically eliminate hydrocarbons from soil by utilizing the asphalt plant.

This embodiment for an apparatus for retrofitting a hot mix asphalt plant of the type having a drum mixer or dryer drum with a burner at one end to perform contaminated soil remediation comprises means for initially heating the contaminated soil to a temperature sufficient to vaporize contaminants present in the contaminated soil, means for feeding the contaminated soil to the initial heating means, and means for introducing the gases created by vaporizing the contaminants to the hot mix asphalt plant burner. The asphalt plant burner acts as the reheating means, and the baghouse of the asphalt plant acts as the particulate removal means. The asphalt making process acts as the cooling means for the gases reheated by the asphalt plant burner. The gases are cooled as the heat therein is transferred to the asphalt mixture being produced by the asphalt plant. The exhaust stack of the asphalt plant acts as the exhaust means. While the present invention will be described for use with an asphalt plant having a drum mixer, it will be understood that the present invention may also be used with a hot mix asphalt batch plant having a dryer or any other hot mix process using a burner.

In this embodiment, the decontaminated soil is preferably removed from the initial heating means and mixed with virgin aggregate prior to the introduction of the aggregate into the drum mixer. This allows the hydrocarbons present therein to be vaporized for a second time as the aggregate is heated during the asphalt-making process. This second vaporization ensures that virtually all of the hydrocarbons initially present in the soil are burned off. The decontaminated soil is also preferably incorporated into the hot mix asphalt produced by the asphalt plant. This further reduces the effect of hydrocarbons as the asphalt itself is composed of hydrocarbons and the hydrocarbons present in the soil become entrapped in the hot mix asphalt. In the alternative, the decontaminated soil can be conveyed to a stock pile of decontaminated soil. The soil can then be reused as desired.

The gases from the initial heating means are then introduced into the hottest part of the flame in the asphalt plant burner. In this way virtually all of the combustible gases are incinerated. Also the heat contained in these gases is not wasted, but is utilized to assist in heating the virgin aggregate. The heating of the aggregate and asphalt in the drum mixer also serves to cool the exhaust gases from the asphalt plant burner prior to their entering the baghouse.

In a further embodiment of the present invention, the exhaust gases from the initial soil heating means are cooled to a temperature sufficient to condense hydrocarbons from the air stream. In this embodiment, no afterburner is used. The condensed hydrocarbons are then collected disposed of or may even by recycled.

It is an object of the present invention to inexpensively and effectively destroy all of the hydrocarbons present in contaminated soil. A further object of the present invention is to allow for optimizing the destruction of hydrocarbons, and to prevent them from being released into the air.

Other advantages and aspects of the invention will become apparent upon making reference to the specification, claims, and drawings to follow.

DETAILED DESCRIPTION OF THE INVENTION

Figure 1:
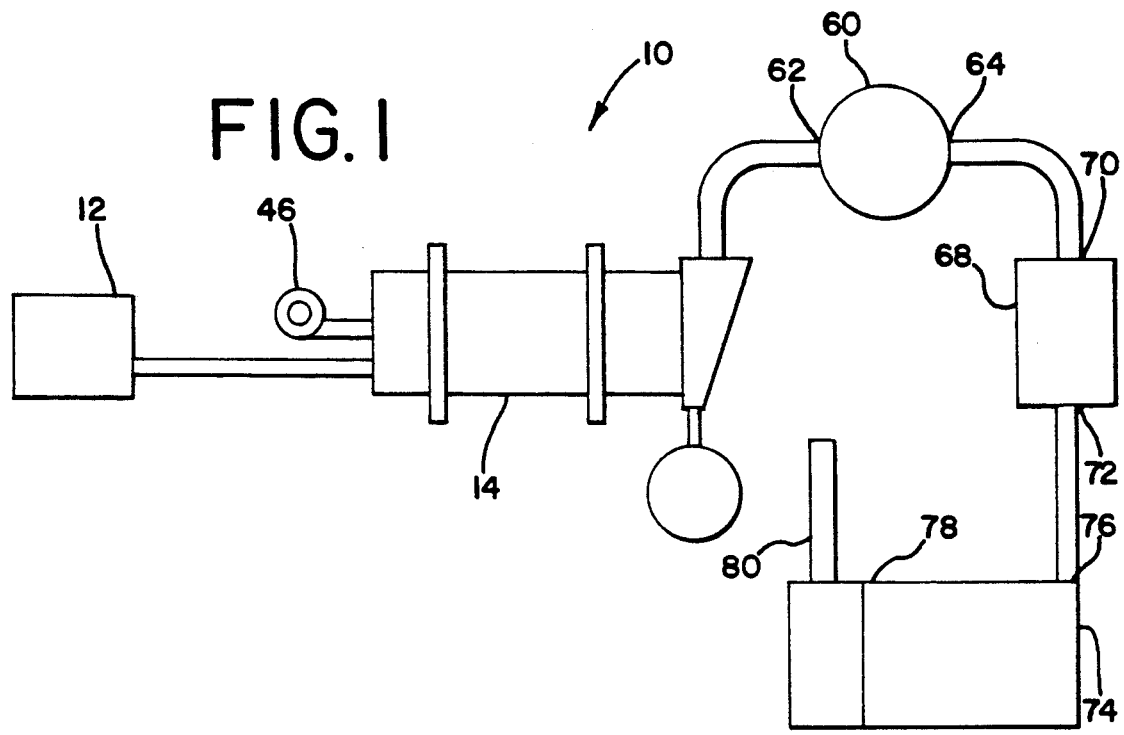
FIG. 1 is a schematic of one embodiment of the soil remediation apparatus of the present invention wherein the exhaust gases are reheated and cooled prior to entering the baghouse.

While this invention is susceptible of embodiment in many different forms, there is shown in the drawings, and will herein be described in detail, a preferred embodiment of the invention, with the understanding that the present disclosure is to be considered as an exemplification of the principles of the invention, and is not intended to limit the broad aspect of the invention to the embodiment illustrated.

Figure 3:
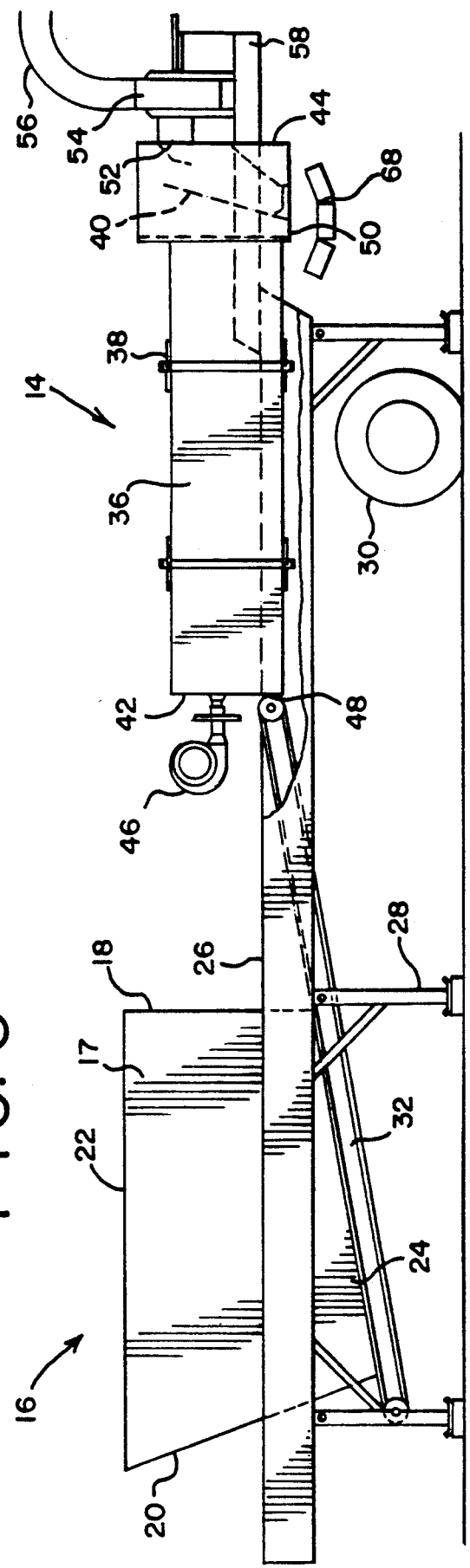
FIG. 3 is a side elevational view of the preferred embodiment of the feeding means and initial heating means which may also be retrofitted to a typical hot mix asphalt plant.

FIG. 1 discloses one embodiment of the soil remediation apparatus 10 of the present invention. A feeding means 12 feeds contaminated soil to a means 14 for initially heating the contaminated soil to a temperature sufficient to vaporize combustible contaminants therein. FIG. 3 discloses the preferred embodiment of the feeding means 12 and the initial heating means 14. The feeding means 12 preferably includes a hopper 16 which is preferably rectangular having two side walls 17, a first end wall 18 and a second end wall 20. The hopper 16 also has an inlet portion 22 at its top and an outlet portion 24 at its bottom.

The hopper 16 is supported on a frame 26 having retractable legs 28. The frame 26 preferably has a pair of wheels 30 rotatably attached to allow the present invention to be transported from site to site. A first conveyor 32 supported by the frame 26 is located at the outlet portion 24 of the hopper 16. Soil contaminated with hydrocarbons such as gasoline, kerosene, or other combustible materials is fed into the hopper 16. The soil is fed by gravity from the hopper 16 to the first conveyor 32. The rate of flow of contaminated material from the hopper 16 along the first conveyor 32 can be controlled using any conventional means such as a sliding gate.

The first conveyor 32 transports the contaminated soil to the initial heating means 14. Preferably, the initial heating means 14 comprises a rotatable drum 36 mounted on at least a pair of tires 38, preferably steel, a first end wall 42, and an exhaust housing 44. The tires 38 are supported on the frame 26 by rotating trunnions (not shown). The drum 36 and its supporting tires and trunnions may be inclined at a slight angle (commonly in the range of one to five degrees) so as to move the contaminated soil through the drum 36 by gravity, or if the drum 36 is horizontal as shown in FIG. 1, lifting flights within the drum 36 may be angled to move the soil longitudinally through it.

Projecting through the first end wall 42 is a preburner 46 of conventional design and capable of generating a flame having a temperature of approximately 3000° F. It may use gas or light oil or any other suitable fuel. Also at the first end wall 42 is an entrance portion 48 to allow contaminated soil transported by the first conveyor 32 to enter the initial heating means 14. The exhaust housing 44 of the initial heating means 14 has an exit opening 50 to permit decontaminated soil to exit. The exhaust housing 44 may contain a wall 40 to create what is known in the trade as a "knock-out box" to act as a primary dust collector to recover a portion of the dust and particulate matter entrained in the stream of exhaust gases. The decontaminated soil must be cooled as it exits the initial heating means 14. This may be done, by way of example, by allowing it to air cool or by introducing it to a separate cooling means (not shown).

The entrance portion 48 and burner 46 are both preferably located at the first end wall 42. This is known as a "parallel flow" arrangement. Another configuration is the "counterflow," whereby the entrance portion 48 is located opposite the burner 46. The parallel flow arrangement produces higher temperatures in the soil, thus vaporizing a greater amount of hydrocarbons than the counterflow.

As the contaminated soil enters the initial heating means 14 through the entrance portion 48 the soil is heated to a temperature of approximately 700°-800° F. As the soil is heated to this temperature, the hydrocarbons and other combustible materials present in the soil are combusted. The exhaust housing 44 also has an exhaust port 52 to allow the combustion gases and any evaporated hydrocarbons to be exhausted from the initial heating means 14. The resulting gases are exhausted out of the initial heating means 14 by an exhaust fan 54 communicating with a duct 56. The duct 56 is, preferably, insulated. The exhaust fan 54 is supported by a frame extension 58. The exhausted gases are directed to a reheating means 60 (FIG. 1).

The reheating means 60 has an inlet 62 and an outlet 64 for the exhausted gases to pass through. The reheating means 60 also has a burner similar to that of the initial heating means 14 preferably projecting through one of the sides of the reheating means 60. After the gases are reheated in the reheating means 60, they are directed to a cooling means 68.

The cooling means 68 has a gas inlet 70 and an outlet 72, and preferably comprises any typical heat exchanger sufficient to cool the exhaust temperature of the gases to 400° F. or below. The cooling means 68 can be an air-to-air heat exchanger or can have coils through which a refrigerant such as water can be used to cool the gas stream. If the latter is used, a water recirculation system (not shown) will also be necessary.

From the cooling means 68, the gases are directed to a particulate removal means 74. The particulate removal means has an inlet 76 and an outlet 78 to permit the exhaust gases to pass therethrough, and preferably comprises a baghouse of conventional design. In the particulate removal means 74, particulate matter is removed from the gas stream. After the gases exit the particulate removal means 74, they are exhausted to the atmosphere through an exhaust means 80. The exhaust means 80 preferably comprises a stack having an inlet to accept gases exiting from the outlet 78 of the particulate removal means. The gases exiting the exhaust means 80 are virtually free of combustible contaminants, as well as for particulate matter. Moreover, the gases are not exceedingly hot, and do not cause thermal pollution.

The reheating means 60 is preferably placed after the initial heating means 14 but before the cooling means 68 and the particulate removal means 74. This allows for a greater gas inlet temperature to the reheating means 60, thereby reducing the energy required to reheat the gas. This also eliminates virtually all of the hydrocarbons before they enter the particulate removal means 74, thereby improving efficiency of particulate removal, and reducing maintenance costs.

Figure 2:
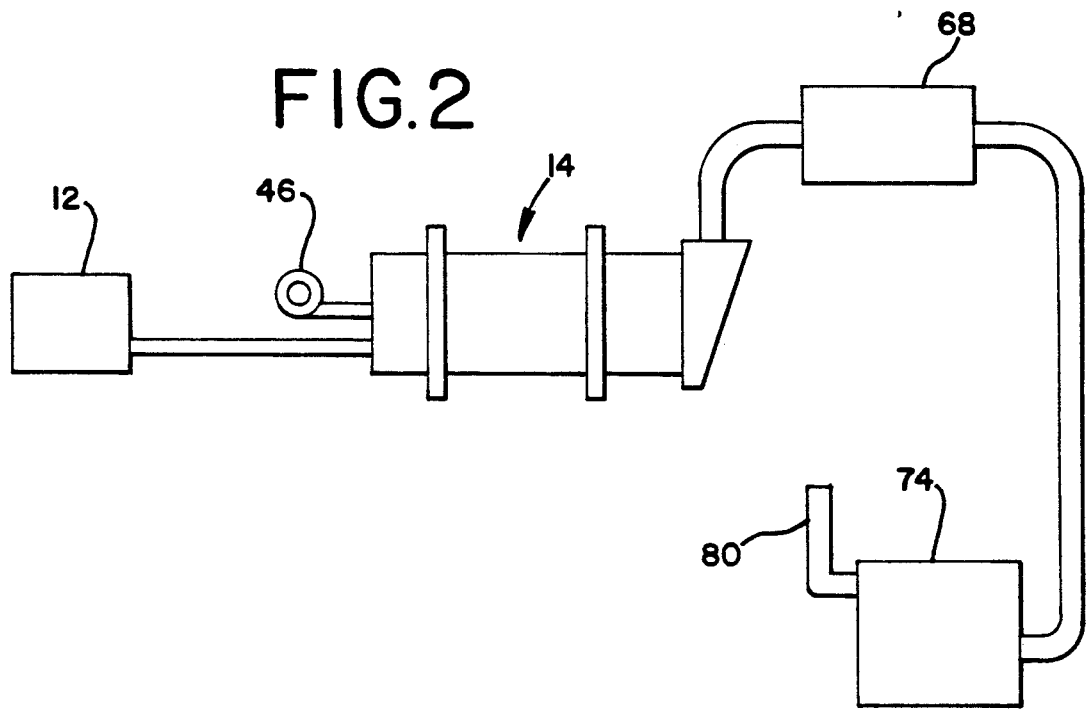
FIG. 2 is a schematic of another embodiment of the present invention of the present invention wherein residual contaminants in the exhaust gases are cooled and condensed from the exhaust gases.

FIG. 2 discloses an embodiment of the present invention wherein the exhaust gases from the initial heating means 14 are passed directly into the cooling means 68. No reheating of the exhaust gas occurs. The gases are cooled in the cooling means 68 to a temperature sufficient to condense any residual contaminants from the gas stream. The condensed contaminants are then collected and disposed of or may even be recycled. The gases are then directed to a particulate removal means 74 and exhaust means 80 as in the previous embodiment.

Figure 4:
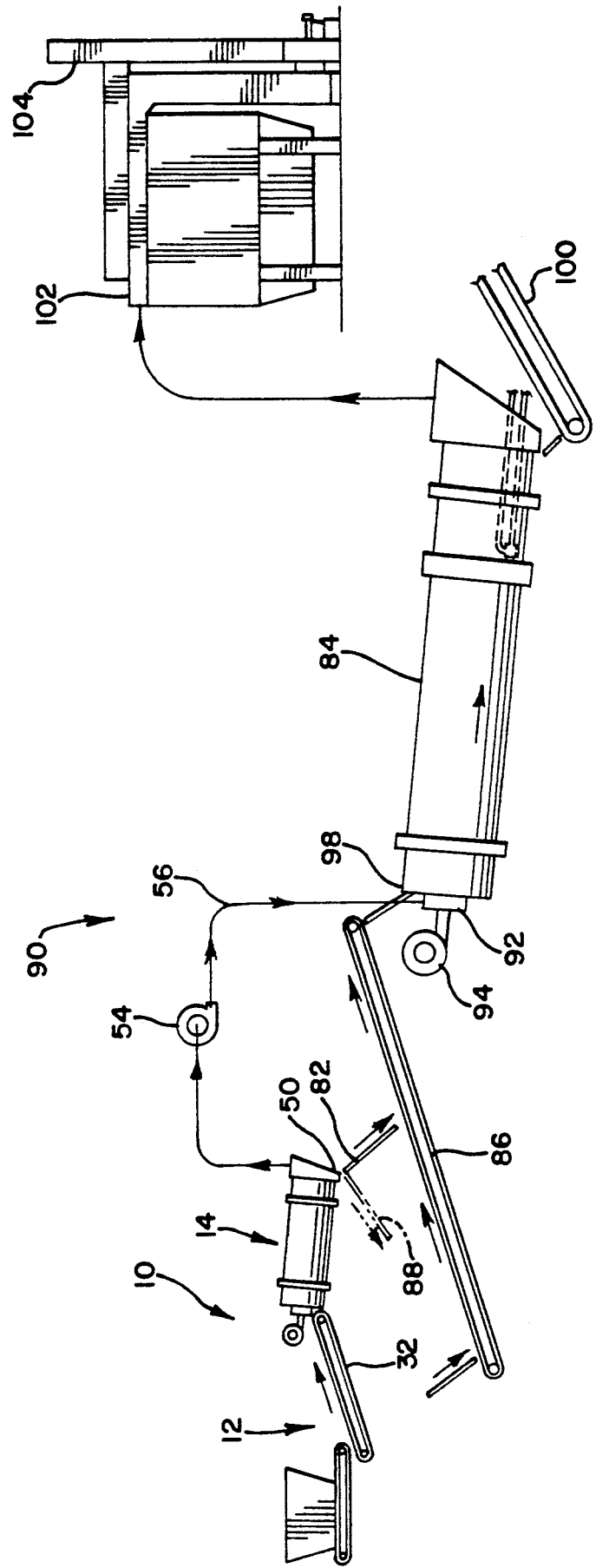
FIG. 4 is a schematic of the feeding means and initial heating means of FIG. 3 retrofitted to a typical hot mix asphalt plant.

FIG. 4 discloses an embodiment of the present invention incorporating a typical hot mix asphalt plant 90. In this embodiment, after the hydrocarbons are burned off in the initial heating means 14, the decontaminated soil is discharged from the initial heating means 14 through the exit opening 50 and conveyed by a second conveyor or chute 82 and mixed with virgin aggregate being fed to a drum mixer or dryer 84 by a third conveyor 86, or it may be diverted by means of a fourth conveyor or chute 88 to a stock pile of decontaminated soil for reuse.

After the fumes and hot gases created by combusting the contaminants from the soil are carried from the initial heating means 14 through the duct 56, they are carried to a vapor injection shroud 92 located between the end of the drum mixer 84 and the burner 94. The vapor injection shroud 92 collects fumes from the initial heating means 14 to allow the burner 94 to combust the fumes. The burner 94 is capable of generating a flame of approximately 3000° F., and may be gas-fired. The exhaust fan 54 associated with the initial heating means 14 moves the fumes through the duct 56 to the burner 94. After introduction into the burner 94, the hydrocarbon vapors are again combusted to rid the exhaust of any hydrocarbons which were not previously burned in the initial heating means 14. This second combustion ensures that virtually all of the hydrocarbons are effectively destroyed.

FIG. 4 also schematically discloses a typical hot mix asphalt plant 90 of a type known in the trade as a "drum mixer." Another type of asphalt plant commonly used but not shown here is known as a batch plant. In a batch plant the aggregate drying operation is performed in a drum known as a dryer, and mixing the aggregate with liquid asphalt is done in a separate mixer. In the drum mixer type both drying and mixing operations are performed in the same drum. The processes described here, the heating and drying of the aggregate by means of a burner 94, would apply equally to either type of asphalt plant. Therefore, the initial heating means 14 herein described may be used equally well with either type of asphalt plant 90. The operation of either type of hot mix asphalt plant 90 will be understood by one familiar with the art. In a hot mix asphalt plant 90 of either type, virgin aggregate comprised of particles of various sizes are fed onto a conveyor 86. The aggregate is carried along the conveyor to a drum mixer or dryer drum 84 having an aggregate inlet portion 98. The drum mixer or dryer drum 84 has a burner 94 located at one end which injects a flame into the drum mixer or dryer 84.

As described above, the decontaminated soil is preferably mixed with aggregate prior to the introduction of the aggregate into the drum mixer or dryer drum 84. Any remaining remnants of hydrocarbons present in the decontaminated soil will again be heated to approximately 300° F. as the aggregate mixed with the decontaminated soil is heated to make hot mix asphalt. This second incineration of the soil ensures that all but trace amounts of hydrocarbons will be eliminated from the soil, and burned. Once the aggregate and soil mixture have been heated in the drum mixer or dryer drum 84, they are incorporated in hot mix asphalt using a process well-known in the art. In the case of the drum mixer, mixing is done in the same drum. In the case of the dryer drum, the hot dry aggregate is transferred to a separate batch mixer (not shown).

After the hot mix exits the drum mixer 84 or the batch plant (not shown), it is transported by a conveyor 100 to one or more storage silos (not shown) pending transport to a desired paving location. The heated gases containing fine particles from the dried aggregate and soil mixture are exhausted to a baghouse 102 for removal of the particulate material from the airstream. Once the particulate are removed, they are vented by a conventional stack 104 to the atmosphere.

The aggregate can be introduced into the drum mixer or dryer drum 84 either at the end opposite of the burner 94 (counterflow), or at the same end as the burner (parallel flow).

While the preferred embodiment has been illustrated and described, numerous modifications come to mind without departing from the spirit of the invention, and the scope of protection is only limited by the scope of the accompanying claims.

We claim:

1. A method of decontaminating soil comprising the steps of:
   providing a hot mix asphalt plant having a charge of aggregate and asphaltic oil material and including a burner for heating at least said aggregate;
   igniting said burner;
   providing a quantity of said material to be mixed; delivering at least said aggregate to said burner and mixing said heated aggregate and asphaltic oil material at said plant:
   preheating at said plant soil contaminated with combustible material for a time and at a temperature sufficient to vaporize the contaminants present in the soil;
   introducing the gases created by the vaporization of said soil contaminants to said burner to burn any remaining combustible contaminants during the heating of said aggregate material, and
   exhausting the burner-produced gases to the atmosphere and delivering said mix of heated aggregate and asphaltic oil material to a discharge station at said plant.

2. The method of claim 1 wherein said asphalt plant includes a baghouse with a filter for filtering out any solids entrained in the burner produced gases before being dispersed to the atmosphere; feeding the burner produced gases to said baghouse; and feeding the solids filtered by said baghouse to a disposal location.

3. The method of claim 1 wherein the decontaminated soil is fed to and mixed with said aggregate and asphaltic oil material.

4. The method of claim 1 wherein the decontaminated soil is fed to a discharge point for re-use as decontaminated soil.

* * * * *